(12) United States Patent
Shirk et al.

(10) Patent No.: US 6,237,940 B1
(45) Date of Patent: May 29, 2001

(54) INFLATOR FOR SIDE CURTAIN

(75) Inventors: Bryan W. Shirk; Timothy A. Swann; Roy D. Van Wynsberghe, all of Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/515,481

(22) Filed: Feb. 29, 2000

(51) Int. Cl.[7] .................................................. B60R 21/22
(52) U.S. Cl. ................................... 280/730.2; 280/728.1; 280/741; 102/705; 102/530; 149/19.4
(58) Field of Search ............................ 280/743.1, 728.1, 280/736, 741, 730.2; 102/288, 289, 290, 705, 530, 531; 149/6, 18, 19.4

(56) References Cited

U.S. PATENT DOCUMENTS

| 1,298,097 | * | 3/1919 | Roberts | 105/705 |
|---|---|---|---|---|
| 3,880,447 | * | 4/1975 | Thorn et al. | 280/741 |
| 5,060,973 | * | 10/1991 | Giovanetti | 280/736 |
| 5,280,952 | * | 1/1994 | Hirabayashi et al. | 280/743.1 |
| 5,593,180 | | 1/1997 | Cuevas et al. . | |
| 6,039,347 | * | 3/2000 | Maynard | 280/736 |
| 6,062,142 | * | 5/2000 | Scheffee | 102/289 |
| 6,074,701 | * | 6/2000 | Beasley, Jr. | 280/728.1 |
| 6,077,372 | * | 6/2000 | Mendenhall et al. | 149/6 |

* cited by examiner

Primary Examiner—Robert P. Olszewski
Assistant Examiner—Lynda Jasmin
(74) Attorney, Agent, or Firm—Tarolli, Sundheim, Covell, Tummino & Szabo L.L.P.

(57) ABSTRACT

An apparatus (10) comprises an inflatable vehicle occupant protection device (14) having internal surfaces (48). The apparatus (10) also comprises an inflator (20) for directing gas (104) into the inflatable device (14) to inflate the inflatable device. The inflator (20) simultaneously directs a coating material (102) into the inflatable device to coat the internal surfaces (48) of the inflatable device (14) to decrease the permeability of the inflatable device to the gas.

11 Claims, 4 Drawing Sheets

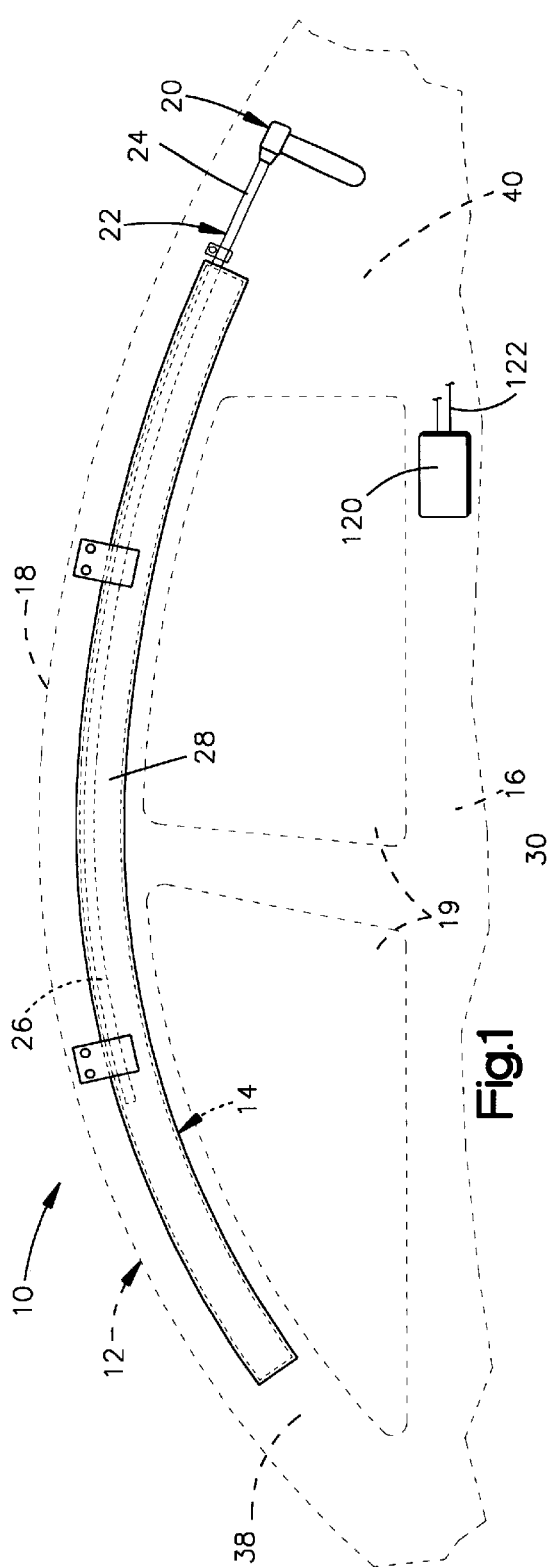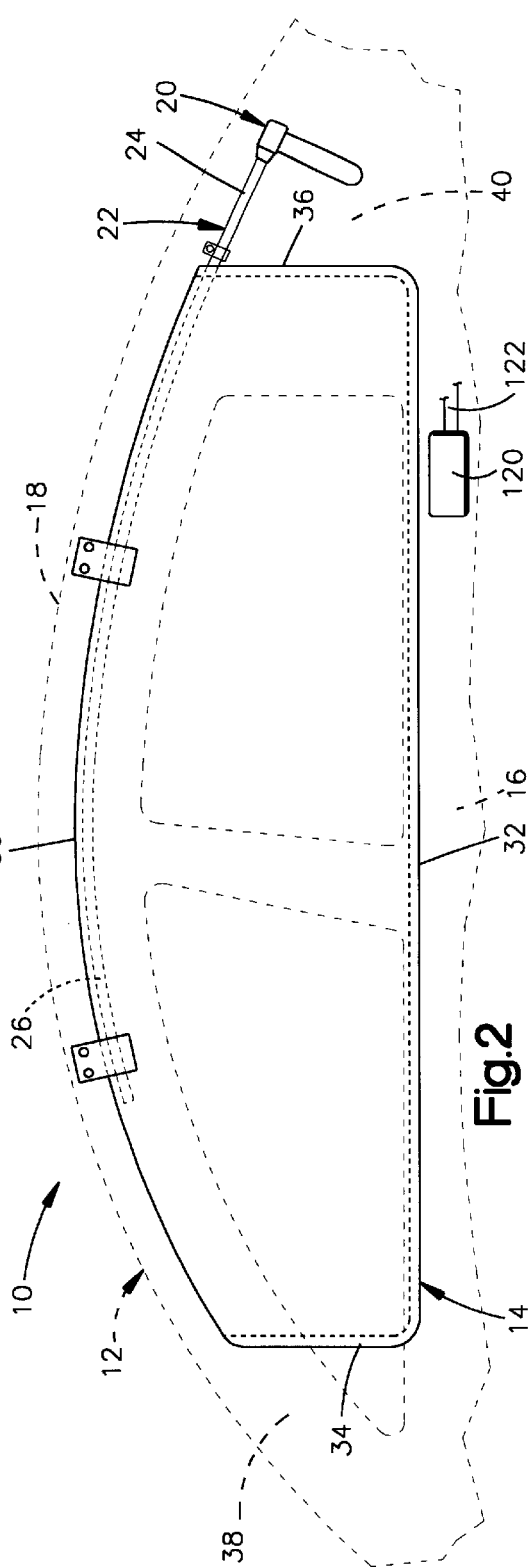

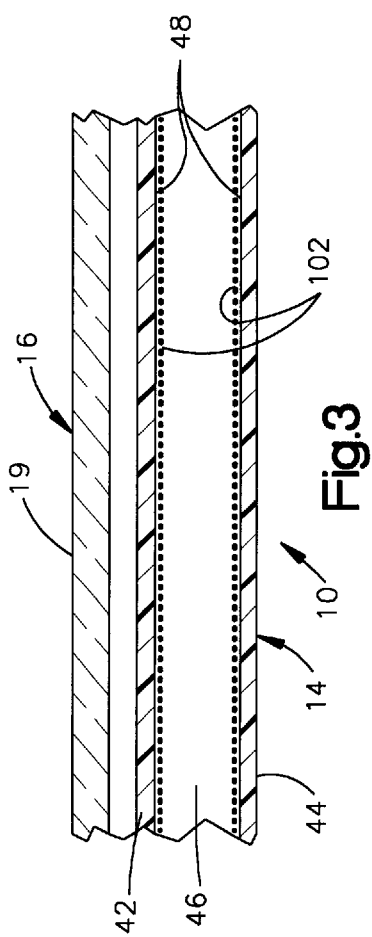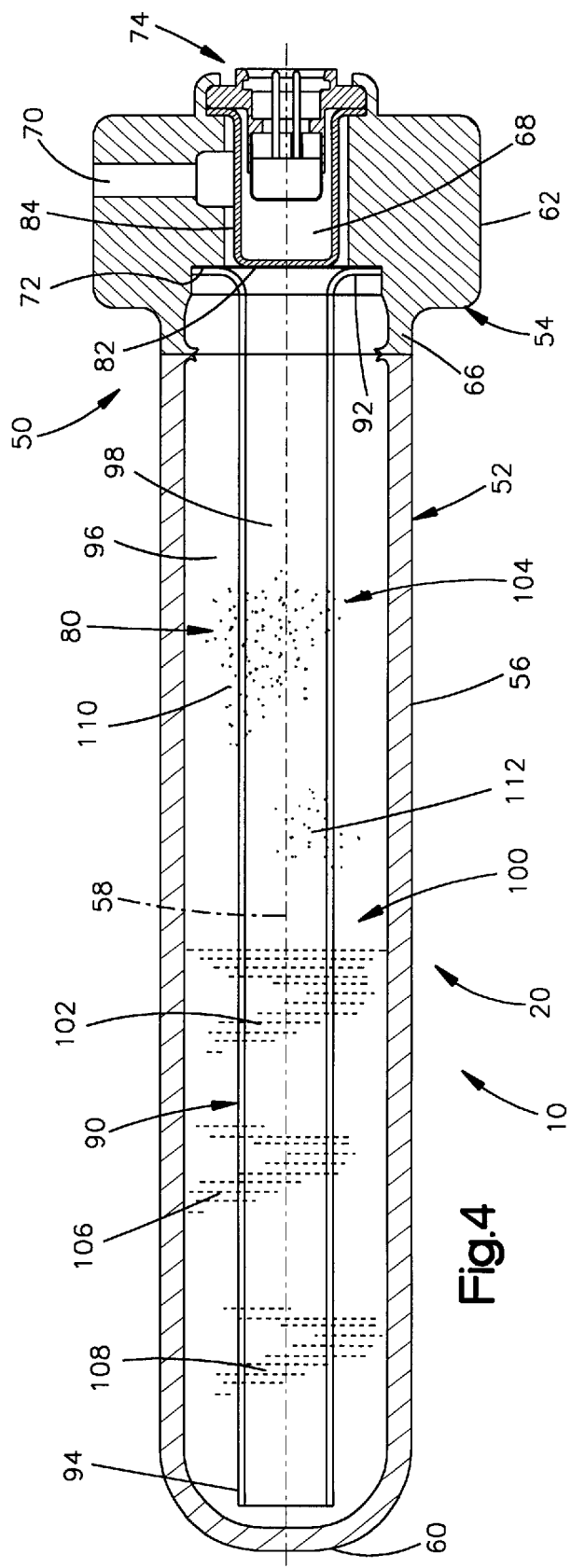

INFLATOR FOR SIDE CURTAIN

BACKGROUND OF THE INVENTION

1. Technical Field

The present invention relates to an inflator for an inflatable vehicle occupant protection device, such as a side curtain, that remains inflated for an extended period of time.

2. Description of the Prior Art

It is known to inflate a vehicle occupant protection device, such as an air bag, to help protect a vehicle occupant. The protection device is inflated by inflation fluid from an inflator. One type of protection device is a side curtain. The side curtain is inflatable into a position between the vehicle occupant and the vehicle side structure to help protect the vehicle occupant in the event of a side impact to the vehicle or a rollover condition of the vehicle.

It is known to inflate a side curtain initially with inflation fluid at a relatively high pressure and flow rate, then to maintain the side curtain inflated for an extended period of time with a continued flow of inflation fluid at a relatively low rate. In order to maintain the side curtain inflated, the side curtain is made from a coated fabric so as to be impermeable to the inflation fluid. Coating a fabric makes it heavier and bulkier than uncoated fabric.

SUMMARY OF THE INVENTION

The present invention is an apparatus comprising an inflatable vehicle occupant protection device having internal surfaces. The inflatable device when inflated helps to protect an occupant of a vehicle. The apparatus also comprises an inflator for directing gas into the inflatable device to inflate the inflatable device. The inflator simultaneously directs a coating material into the inflatable device to coat the internal surfaces of the inflatable device to decrease the permeability of the inflatable device to the gas.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus including an inflator in accordance with a first embodiment of the present invention and a side curtain shown in an uninflated condition;

FIG. 2 is a view similar to FIG. 1 showing the side curtain in an inflated condition;

FIG. 3 is a sectional view of a portion of the side curtain of FIG. 1;

FIG. 4 is a longitudinal sectional view of the inflator of FIG. 1;

DETAILED DESCRIPTION OF EMBODIMENTS OF THE INVENTION

Figure 5:
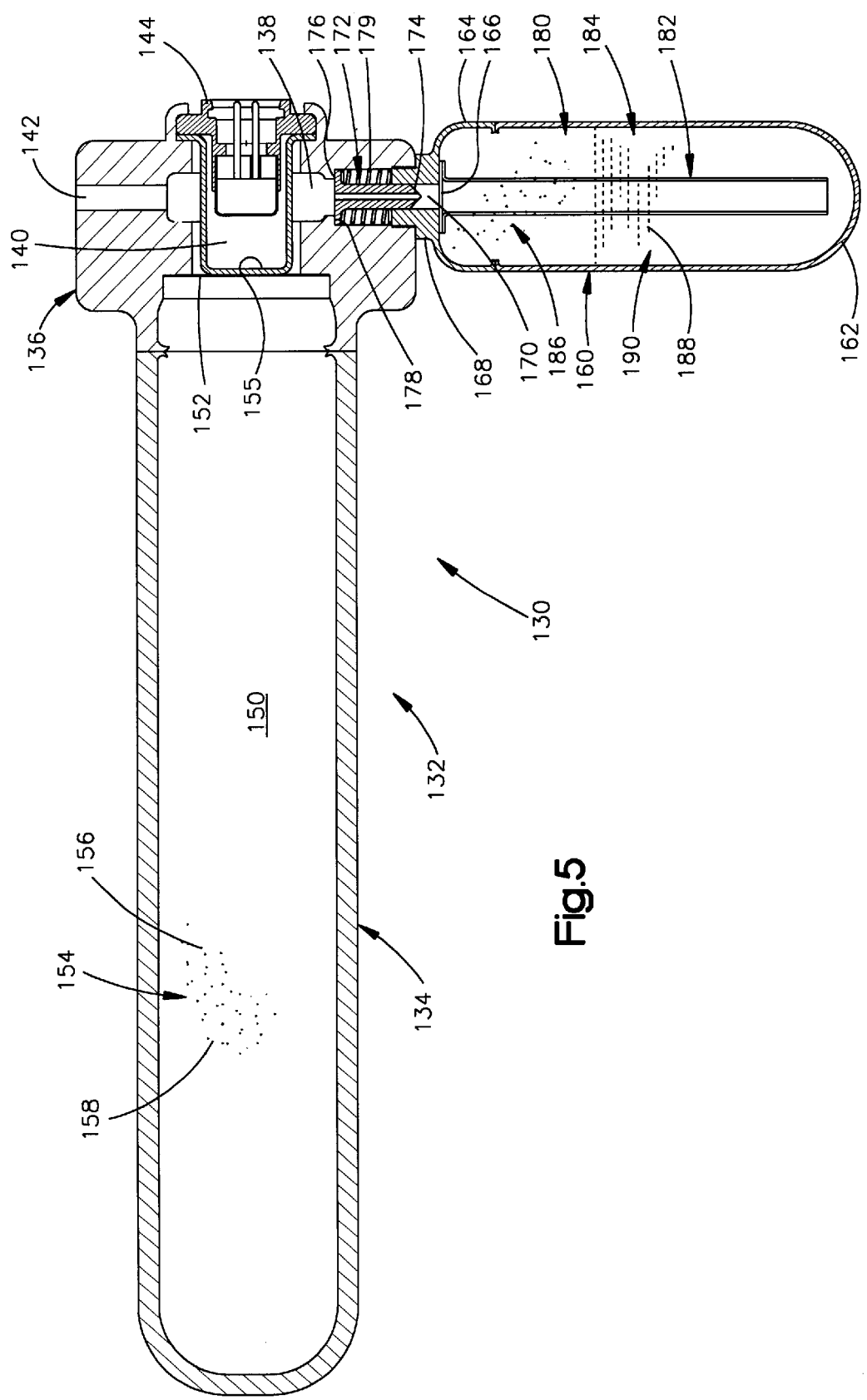
FIG. 5 is a view similar to FIG. 4 of an inflator in accordance with a second embodiment of the invention.

The present invention relates to an inflator for an inflatable vehicle occupant protection device, such as a side curtain, which remains inflated for an extended period of time. As representative of the present invention, FIG. 1 illustrates an apparatus 10 for helping to protect an occupant of a vehicle 12. The apparatus 10 includes a vehicle occupant protection device in the form of a side curtain 14, which is mounted adjacent to the side structure 16 of the vehicle 12 and a roof 18 of the vehicle. The side structure 16 of the vehicle 12 includes side windows 19.

The apparatus 10 includes an inflator 20, described below in detail, for inflating the side curtain 14. The inflator 20 is connected in fluid communication with the side curtain 14 through a fill tube 22. The fill tube 22 has a first end portion 24 for receiving fluid from the inflator 20. The fill tube 22 has a second end portion 26 that is disposed in the side curtain 14. The second end portion 26 of the fill tube 22 has a plurality of openings (not shown) that provide fluid communication between the fill tube 22 and the side curtain 14.

The apparatus 10 includes a housing 28 (FIG. 1) that stores the side curtain 14 in a deflated condition. The fill tube 22, the deflated side curtain 14, and the housing 28 have an elongate configuration and extend along the vehicle roof 18 and along the side structure 16 of the vehicle 12 above the side windows 19.

The side curtain 14 (FIG. 2) includes a top edge 30 and an opposite bottom edge 32. The top edge 30 is positioned adjacent to the intersection of the roof 18 and the side structure 16 of the vehicle 12. The side curtain 14 also includes a front edge 34 and an opposite rear edge 36. The front edge 34 is positioned adjacent to an A-pillar 38 of the vehicle 12. The rear edge 36 is positioned adjacent to a C-pillar 40 of the vehicle 12.

The side curtain 14 is made from an uncoated fabric. Specifically, the side curtain 14 (FIG. 3) is made from two layers 42 and 44 of a fabric material, such as woven nylon, that define between them an inflation fluid volume 46. The layers of fabric material 42 and 44 have internal surfaces 48. The fabric material from which the side curtain 14 is made is permeable to gas directed into the inflation fluid volume 46 of the side curtain.

The inflator 20 includes a container 50 having a generally elongate configuration. The container 50 includes a main body portion 52 and a manifold or end cap 54. The main body portion 52 of the container 50 has a tubular, cylindrical configuration including an axially extending, cylindrical side wall 56 centered on a longitudinal central axis 58 of the inflator 20. The main body portion 52 also includes a domed end wall 60.

The manifold 54 is a one-piece metal member having a generally cylindrical configuration including a cylindrical side wall 62. A welding flange 66 of the manifold 54 is secured to the open end of the main body portion 52 by a friction weld. The manifold 54 could alternatively be secured to the main body portion 52 of the container 50 by other known methods, such as laser welding, brazing, or screw threads.

The manifold 54 has a central chamber 68 radially inward of the side wall 62. An inflation fluid outlet passage or nozzle 70 extends radially outward from the central chamber 68. The nozzle 70 is in fluid communication with the first end portion 24 of the fill tube 22. An electrically actuatable initiator 74 of a known configuration is mounted on the manifold 54 and projects into the central chamber 68.

The main body portion 52 and the manifold 54 define a storage chamber 80 in the container 50. The manifold 54 has an annular, radially extending internal shoulder surface 72 presented toward the main body portion 52 of the container 50. A rupturable burst disk 82 is secured to the shoulder surface 72 and blocks flow of inflation fluid out of the storage chamber 80. A support cup 84 in the central chamber 68 supports the burst disk 82 against the pressure of inflation fluid in the storage chamber 80.

The inflator includes a tubular member or conduit 90. The conduit 90 is disposed in the storage chamber 80. The conduit 90 has an elongate cylindrical configuration centered on the axis 58. A first end portion 92 of the conduit 90 is flared outwardly and is welded to the shoulder surface 72 of the manifold 54, in a position overlying the burst disk 82. An opposite second end portion 94 of the conduit 90 is located adjacent to the domed end wall 60 of the main body portion 52 of the container 50. The second end portion 94 of the conduit 90 is spaced axially inward from the end wall 60 by a small distance.

The conduit 90 divides the storage chamber 80 into two portions. An annular outer portion 96 of the storage chamber 80 is located radially outward of the conduit 90. A cylindrical inner portion 98 of the storage chamber 80 is located within the conduit 90. The inner chamber portion 98 is in fluid communication with the burst disk 82 and forms a passage in the conduit 90. The outer chamber portion 96 is in fluid communication with the inner chamber portion 98 only through the second end portion 94 of the conduit 90.

The storage chamber 80 contains inflation fluid 100 under pressure for inflating the side curtain 14. The inflation fluid 100 includes a quantity of a coating material or sealant 102, and a gaseous component or gas 104.

The sealant 102 is a one-part, non-curing, high viscosity material with wetting characteristics that enable it to flow over the internal surfaces 48 of the side curtain 14. The sealant 102, when applied to the internal surfaces 48 of the side curtain 14, makes the fabric material layers 42 and 44 of the side curtain substantially impermeable to the inflation fluid 100. The sealant 102 can be a urethane, acrylic, polyether modified silicone, polysulfide or silicone compound, and is provided in the form of a highly viscous liquid.

The inflator 20 is, preferably, oriented vertically in the vehicle 12, with the domed end wall 60 lowest, to maintain the liquid sealant 102 in the position shown in FIG. 3 adjacent to the domed end wall of the container 50. When the inflator 20 is in this orientation, a first portion 106 of the liquid sealant 102 is located in the outer chamber portion 96, between the gas 104 and the domed end wall 60 of the container 50. A second portion 108 of the liquid sealant 102 is located in the inner chamber portion 98, that is, inside the conduit 90.

The gaseous component 104 of the inflation fluid 100 is a known gas suitable for inflating an inflatable device, such as nitrogen or argon. The gas 104 is preferably stored at a pressure of 4,000 to 5,000 psi or more. A first portion 110 of the gas 104 is located in the outer chamber portion 96, between the body of liquid sealant 102 and the manifold 54. A second portion 112 of the gas 104 is located in the inner chamber portion 98, that is, inside the conduit 90. Additionally, some of the gas 104 is dissolved in the liquid sealant 102 because of the high pressure at which the gas is stored.

In the event of a rollover condition of the vehicle 12 or a side impact to the vehicle of a magnitude greater than a predetermined threshold value, a sensor mechanism 120 (FIG. 1) provides an electrical signal over lead wires 122 to the inflator 20. The electrical signal causes the initiator 74 to be energized. The inflator 20 discharges inflation fluid under pressure into the fill tube 22, in a manner described below in detail. The fill tube 22 directs the fluid into the side curtain 14. The side curtain 14 inflates under the pressure of the inflation fluid from the inflator 20. The housing 28 (FIG. 1) opens and the side curtain 14 inflates away from the roof 18 in a downward direction as shown in the drawings into the position illustrated in FIG. 2.

When the electrical actuation signal is provided to the inflator 20 over the lead wires 122 as described above, the initiator 74 is energized, causing the burst disk 82 to rupture. The gas portion 112 located in the inner chamber portion 98 begins to flow out of the inner chamber portion into the central chamber 68 of the manifold 54 and thence through the outlet 70 into the fill tube 22.

As the gas portion 112 flows out of the inner chamber portion 98, the pressure in the inner chamber portion decreases very rapidly. As a result, the gas 104 that is dissolved in the liquid sealant 102 comes out of the sealant and flows along the passage 98 in the conduit 90 in a direction toward the manifold 54. This gas 104 flows into the central chamber 68 in the manifold 54, and out through the nozzle 70 into the side curtain 14. Some of the liquid sealant 102 is entrained in this flowing gas 104 and thus flows out of the inflator 20 into the side curtain 14.

As the gas portion 112 flows out of the inner chamber portion 98, a large pressure differential is created across the body of liquid sealant 102. That is, the pressure in the outer chamber portion 96 becomes much greater than the pressure in the inner chamber portion 98. The pressure differential causes the body of liquid sealant 102 to flow along the passage 98 in the conduit 90 in a direction toward the manifold 54. Some of this sealant 102 flows out of the inflator 20 into the side curtain 14 in a substantially liquid form, that is, not entrained in the gas 104. Simultaneously, some of the gas 110 from the outer chamber portion 96 diffuses through the liquid sealant 102 into the passage 98 in the conduit 90. This gas 110 flows out of the inflator 20 carrying with it some entrained sealant 102.

The amount of gas 110 in the outer chamber portion 96 is sufficient to cause substantially all of the sealant 102 eventually to be directed into the fill tube 22 and thence into the side curtain 14. A small amount of sealant 102 remains at the bottom of the inflator 20, on the end wall 60 of the main body portion 52, when all the gas 104 has exited the inflator.

The sealant 102, when it flows into the side curtain 14, coats the internal surfaces 48 of the side curtain, as shown schematically in FIG. 3. This coating decreases the permeability of the fabric layers 42 and 44 of the side curtain 14. As a result, the side curtain 14 remains pressurized for a relatively long period of time, preferably long enough to maintain the side curtain inflated for a period of from five to ten seconds.

FIG. 5 illustrates an inflator 130 in accordance with a second embodiment of the invention. The inflator 130 can be substituted for the inflator 20 in the apparatus 10.

The inflator 130 includes a first container 132 that is similar in construction to the container 50 of the inflator 10. The first container 132 includes a main body portion 134 and a manifold or end cap 136.

The manifold 136 is a one-piece metal member similar in construction to the manifold 54 (FIG. 4). The manifold 136 (FIG. 5) has a second opening 138 that extends radially outward from a central chamber 140 at a location diametrically opposite a nozzle 142. The inflator 130 also includes an initiator 144 mounted in the manifold 136.

The first container 132 defines a first storage chamber 150 in the inflator 130. A rupturable burst disk 152 mounted on the manifold 136 closes the first storage chamber 150. The first storage chamber 150 contains inflation fluid 154 under pressure for inflating a side curtain. A support cup 155 supports the burst disk 152 against the pressure of inflation fluid 154 in the first storage chamber 150.

The inflation fluid 154 in the first storage chamber 150 includes a pressurized gas 156, such as argon or nitrogen, as used in the inflator 10 (FIGS. 1–4). The inflation fluid also includes a curing agent 158, described below.

Extending from the second opening 138 in the manifold 136 is a second container 160. The second container 160 has a tubular, cylindrical configuration with a closed outer end portion 162. An opposite inner end portion 164 of the second container 160 is closed with a rupturable closure such as a burst disk 166.

The inner end portion 164 of the second container 160 includes a retainer 168 that is screwed into the second opening 138 in the manifold 136. The retainer 168 has a central opening 170 that places the interior of the second container 160 in fluid communication with the central chamber 140 of the manifold 136 across the burst disk 166.

A needle or valve member 172 is disposed in the central opening 170 in the retainer 168. The valve member 172 has a sharp outer end portion 174 adjacent the burst disk 166 of the second container 160. A flat inner end portion 176 of the valve member 172 is seated against a valve seat 178 on the manifold 136. The inner end portion 176 of the valve member 172 is exposed to the fluid pressure in the central chamber 140 of the manifold 136. A spring 179 biases the valve member 172 into a closed position against the valve seat 178 on the manifold 136. When the valve member 172 is in the closed position, the burst disk 166 remains unruptured, blocking fluid flow between the second container 160 and the central chamber 140 of the manifold 136.

The second container 160 defines a second storage chamber 180 in the inflator 130. A conduit 182 is disposed in the second storage chamber 180 so that the second container is configured like the container 50 and outputs inflation fluid in a manner similar to the container 50 in the inflator 10 (FIG. 4).

The second storage chamber 180 (FIG. 5) contains inflation fluid 184 under pressure for inflating a side curtain. The inflation fluid 184 includes a quantity of gas 186 under pressure and a quantity of a liquid sealant base component 188.

The gaseous component 186 of the inflation fluid 184 in the second container 160 is preferably the same gas as is located in the first container 132 of the inflator 120. The sealant base component 188 is one part of a two-part sealant 190 that, when applied to the interior surfaces of a side curtain, can make the fabric material of the side curtain substantially impermeable to the inflation fluid. The sealant 190 is a curable material with wetting characteristics that enable it to flow over the fabric material of the side curtain.

The second part or second component of the two-part sealant 190 is the curing agent 158 that is located in the first storage chamber 150. The curing agent 158, when associated with the sealant base component 188, causes the sealant 190 to cure. The curing agent 158 is mixed in solution with the gas 156 in the first container 132.

When the initiator 144 is actuated, the burst disk 152 ruptures. Inflation fluid 154 flows out of the first storage container chamber 150 and into the central chamber 140 in the manifold 136. The inflation fluid 154 flows through the nozzle 142 into the fill tube 22 to begin to inflate the side curtain 14. This inflation fluid 154 includes the curing agent 158 for the two-part sealant 190.

In addition, upon rupturing of the burst disk 152, the fluid pressure in the central chamber 140 of the manifold 136, which acts on the valve member 172, increases rapidly until it overcomes the biasing effect of the valve spring 179. The valve member 172 moves off the valve seat 178, in a downward direction as viewed in FIG. 2.

When the valve member 172 moves far enough, it punctures the burst disk 166 that closes the second container 160. The second container 160 is thereby connected in fluid communication with the central chamber 140 of the manifold 136. Inflation fluid 184 flows out of the second storage chamber 180 into the central chamber 140 of the manifold 136, in the same manner as the inflation fluid 100 flows from the container 50 of the inflator 20 of FIG. 1. This inflation fluid 184 includes the base component 188 of the two-part sealant 190, as well as the gas 186.

When the inflation fluid 154 from the first container 130 mixes with the inflation fluid 184 from the second container 160, the curing agent 158 mixes with the sealant base component 188. The mixed components of the sealant 190 flow into the side curtain together with the gas portion of the inflation fluid 154 and 184. As a result, cured sealant 190 is deposited on the internal surfaces of the side curtain. This decreases the permeability of the side curtain to the gaseous component of the inflation fluid 154 and 184. This can help to maintain the side curtain inflated for the desired period of time.

The inflator 130 can provide a larger initial flow of gas into a side curtain as compared to the inflator 10 (FIGS. 1–4). Also, the two-container configuration of the inflator 130 allows the use of a two-part sealant, or coating material, with the two containers 130 and 160 keeping the sealant components separate until actuation of the inflator.

In the inflator 130, the spring 179 is provided to keep the valve member 172 spaced apart from the secondary burst disk 166 prior to actuation of the inflator. The combination of the spring 179 and valve member 172 can be replaced with another suitable mechanism for opening the secondary burst disk 166.

Figure 6:
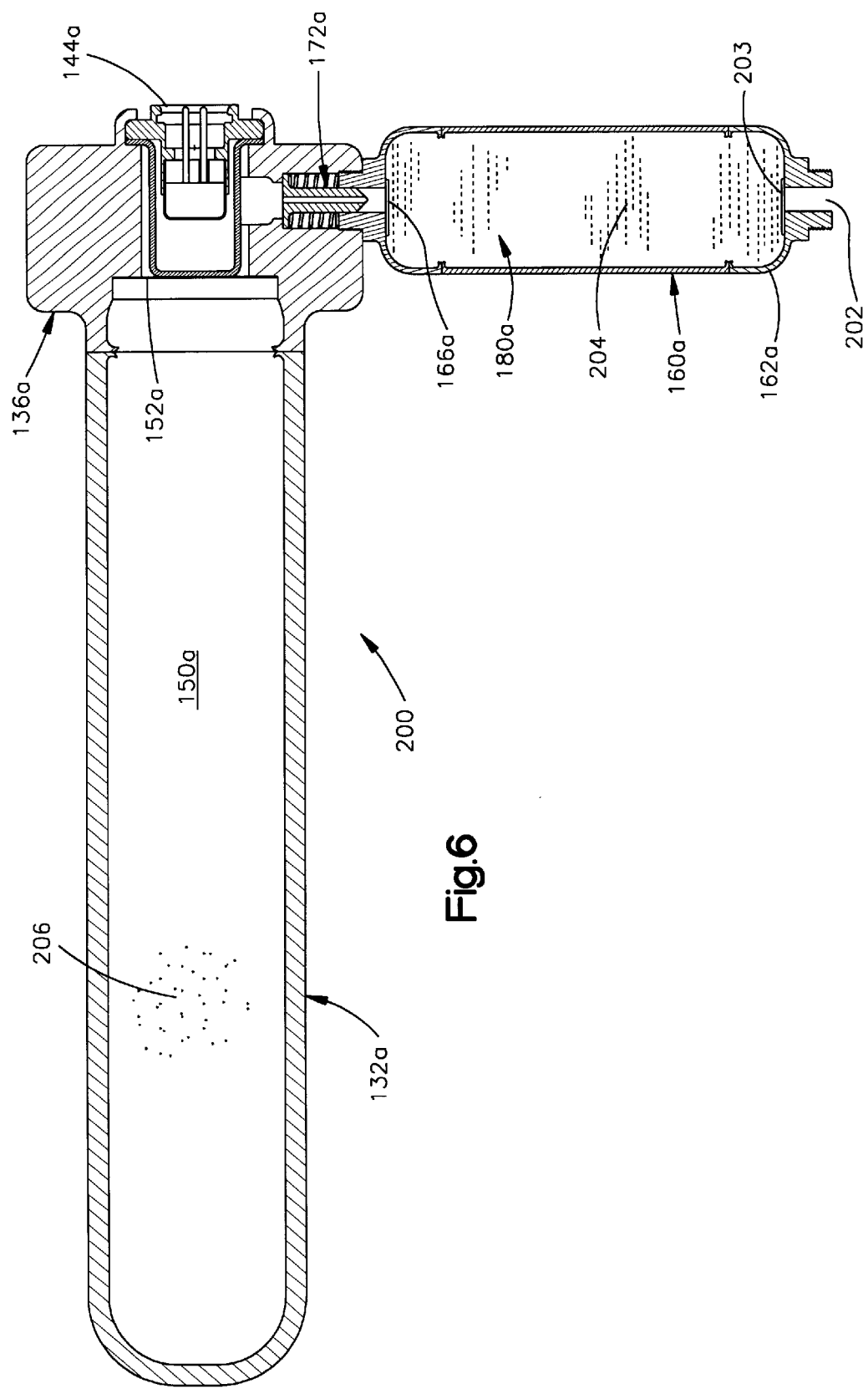
FIG. 6 is a view similar to FIG. 4 of an inflator in accordance with a third embodiment of the invention.

FIG. 6 illustrates an inflator 200 in accordance with a third embodiment of the invention. The inflator 200 is a two-container inflator like the inflator 130 (FIG. 5), and parts that are the same are given the same reference numerals with the suffix "a" added to distinguish them for clarity.

The inflator 200 does not include an outlet or nozzle in the manifold 136a. Instead, an outlet 202 is provided in the outer end portion 162a of the second container 160a, so that all inflation fluid from the inflator 200 flows through the outlet 202 into the side curtain.

The second container 160a contains only a one-part sealant 204, like the one-part sealant 102 used in the inflator 20 (FIG. 4). The first container 132a of the inflator 200 contains only gas 206 for inflating the side curtain.

When the burst disk 152a opens upon actuation of the inflator 200, gas 206 from the first container 132a flows into the manifold 136a. The increased gas pressure in the manifold 136a moves the needle 172a to puncture the burst disk 166a. At the same time, gas from the manifold 136a flows through the needle 172a into the second container 160a, pressurizing the second container and rupturing an outer closure 203. As a result of the flow of gas into the second container 160a, a portion of the sealant 204 in liquid form is forced through the outlet 202 into the side curtain. At the same time, the gas 206 diffuses through the liquid sealant 204 and flows out the outlet 202, with sealant entrained in the gas. The amount of gas 206 in the first container 132a is sufficient to direct substantially all of the sealant 204 into the side curtain.

As with the inflator 130, the needle 172*a* in the inflator 200 can be replaced with another mechanism for opening the secondary burst disk 166*a*. Also, a two-part sealant can be used in the inflator 200, with the curing agent being located in the first container 132*a*.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus comprising:

an inflatable vehicle occupant protection device having internal surfaces, said inflatable device when inflated helping to protect an occupant of a vehicle; and an inflator for directing gas into said inflatable device to inflate said inflatable device and for simultaneously directing a coating material into said inflatable device to coat said internal surfaces of said inflatable device to decrease the permeability of said inflatable device to said gas.

2. An apparatus as set forth in claim 1 wherein said inflator comprises a single container containing said gas and said coating material.

3. An apparatus as set forth in claim 1 wherein said inflator comprises a first container containing said gas and a second container containing said coating material.

4. An apparatus as set forth in claim 1 wherein said inflator comprises a first container containing said gas and a first portion of said coating material, and a second container containing a second portion of said coating material.

5. An apparatus as set forth in claim 4 wherein said first portion of said coating material is a base component of a two-part sealant and said second portion of said coating material is a curing agent component of said two-part sealant.

6. An apparatus as set forth in claim 1 wherein said inflator comprises a first container containing said gas and a second container containing said gas and said coating material.

7. An apparatus as set forth in claim 1 wherein said coating material is a viscous sealant having good wetting characteristics for enabling flow of said coating material over said internal surfaces of said inflatable device.

8. A method of inflating an inflatable vehicle occupant protection device, said method comprising the steps of:

providing an inflatable vehicle occupant protection device having internal surfaces, the inflatable device when inflated helping to protect an occupant of a vehicle;

providing an inflator for inflating the inflatable device;

directing gas from the inflator into the inflatable device to inflate the inflatable device; and directing a coating material from the inflator into the inflatable device to coat the internal surfaces of the inflatable device to decrease the permeability of the inflatable device to the gas;

said step of directing a coating material into the inflatable device being performed simultaneously with said step of directing gas into the inflatable device.

9. A method as set forth in claim 8 wherein said step of directing gas from the inflator comprises directing gas from a first container of the inflator into the inflatable device, and wherein said step of directing a coating material from the inflator comprises directing a coating material from the first container of the inflator into the inflatable device.

10. A method as set forth in claim 8 wherein said step of directing gas from the inflator into the inflatable device to inflate the inflatable device comprises directing gas from a first container of the inflator into the inflatable device, and wherein said step of directing a coating material from the inflator into the inflatable device comprises directing a coating material from a second container of the inflator into the inflatable device.

11. A method as set forth in claim 8 wherein said step of directing a coating material into the inflatable device comprises directing a two-part coating material into the inflatable device.

\* \* \* \* \*